United States Patent
Srikumar et al.

(10) Patent No.: US 12,393,537 B2
(45) Date of Patent: Aug. 19, 2025

(54) PROVIDING MULTI-REQUEST ARBITRATION GRANT POLICIES FOR TIME-SENSITIVE ARBITRATION DECISIONS IN PROCESSOR-BASED DEVICES

(71) Applicant: Microsoft Technology Licensing, LLC, Redmond, WA (US)

(72) Inventors: Rahul Srikumar, Flushing, NY (US); Dimitrios Kaseridis, Austin, TX (US)

(73) Assignee: Microsoft Technology Licensing LLC, Redmond, WA (US)

( * ) Notice: Subject to any disclaimer, the term of this patent is extended or adjusted under 35 U.S.C. 154(b) by 21 days.

(21) Appl. No.: 18/212,938

(22) Filed: Jun. 22, 2023

(65) Prior Publication Data

US 2024/0427719 A1    Dec. 26, 2024

(51) Int. Cl.
*G06F 13/36*        (2006.01)
*G06F 13/364*       (2006.01)

(52) U.S. Cl.
CPC .................................. *G06F 13/364* (2013.01)

(58) Field of Classification Search
CPC ..................................................... G06F 13/364
See application file for complete search history.

(56) References Cited

U.S. PATENT DOCUMENTS

| | | | | |
|---|---|---|---|---|
| 8,312,000 | B1 * | 11/2012 | Burger | G06F 16/24542 707/706 |
| 2003/0172257 | A1 * | 9/2003 | Greenblat | H04L 45/306 709/251 |
| 2007/0260792 | A1 * | 11/2007 | Pathak | G06F 13/364 710/113 |
| 2008/0112313 | A1 * | 5/2008 | Terakawa | G06F 9/5011 370/229 |
| 2014/0189700 | A1 * | 7/2014 | Williams | G06F 13/4027 718/104 |
| 2017/0185542 | A1 | 6/2017 | Batley | |
| 2020/0026674 | A1 * | 1/2020 | Tune | G06F 9/5011 |
| 2021/0279187 | A1 * | 9/2021 | Puder | G06F 13/1668 |

OTHER PUBLICATIONS

International Search Report and Written Opinion received for PCT Application No. PCT/US2024/034646, mailed on Oct. 10, 2024, 15 pages.
Tanenbaum, A. S, "Modern Operating Systems, Processes and Threads", 2001, pp. 71-73, 81, 142-149.

* cited by examiner

*Primary Examiner* — Henry Tsai
*Assistant Examiner* — Harry Z Wang
(74) *Attorney, Agent, or Firm* — Withrow & Terranova, PLLC

(57) ABSTRACT

Providing multi-request arbitration grant policies for time-sensitive arbitration decisions in processor-based devices is disclosed. In this regard, a processor-based device provides an arbitration circuit that is configured to select a request tracker entry of a plurality of request tracker entries of a request tracker circuit to apply a multi-request arbitration grant policy. The arbitration circuit determines a count N of a plurality of requests associated with the request tracker entry, and determines a count R of resource elements that are available of a plurality of resource elements of an arbitrated resource. The arbitration circuit determines whether the count R of resource elements that are available is equal to or greater than N, and if so, issues a single arbitration grant for the plurality of requests associated with the request tracker entry to the request tracker circuit.

20 Claims, 5 Drawing Sheets

Figure 1:
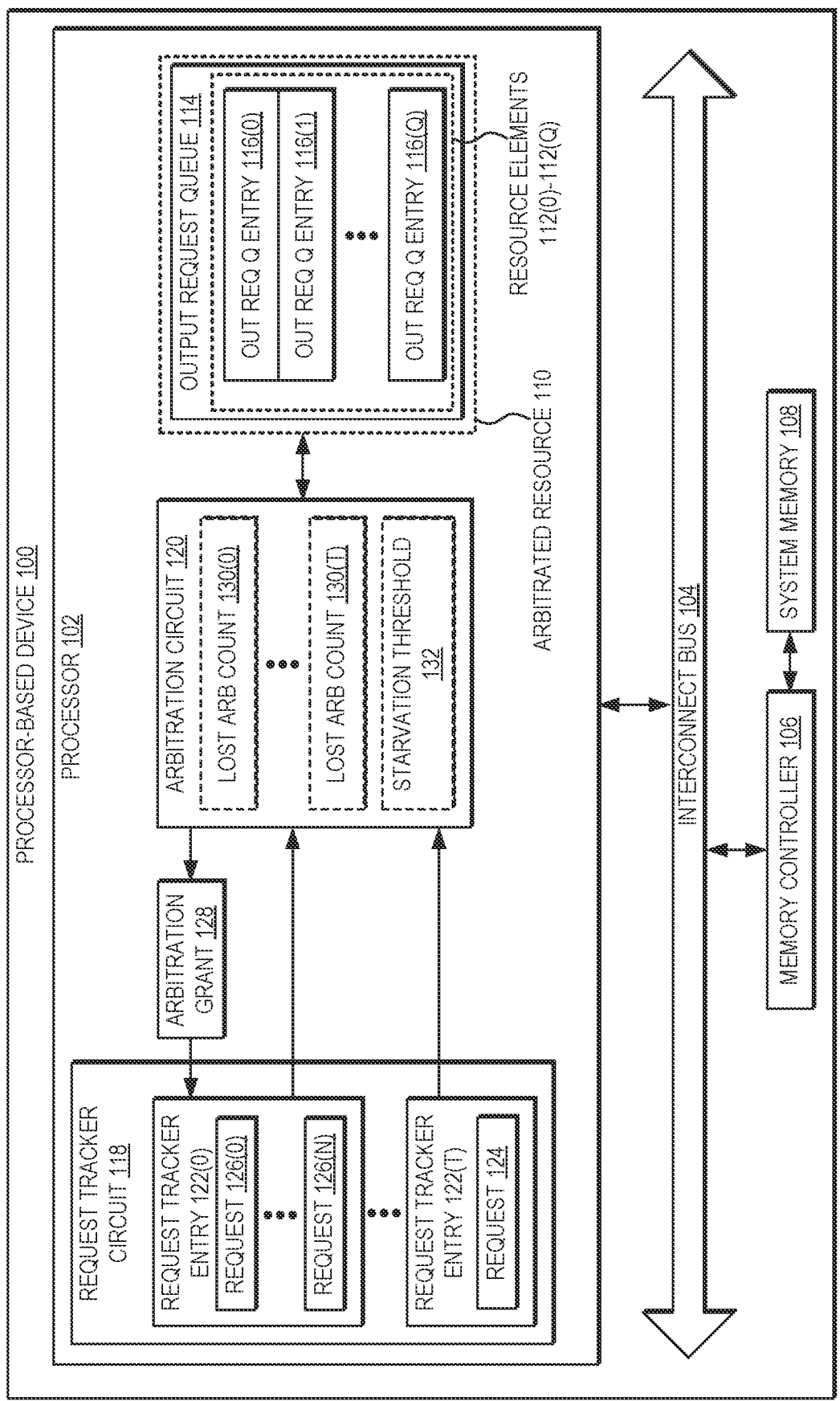

PROVIDING MULTI-REQUEST ARBITRATION GRANT POLICIES FOR TIME-SENSITIVE ARBITRATION DECISIONS IN PROCESSOR-BASED DEVICES

FIELD OF THE DISCLOSURE

The technology of the disclosure relates to management of arbitrated resources in processor-based devices, and, more particularly, to providing time-sensitive arbitration decisions.

BACKGROUND

Modern processor-based devices provide different types of shared resources that may be accessed by multiple clients (e.g., multiple devices or elements of the processor-based device, and/or multiple processes being executed by the processor-based device). Such shared resources may include, as non-limiting examples, access to memory, access to a communications bus, and access to queues or caches provided by the processor-based device. To resolve conflicts between multiple clients seeking to access a shared resource, the processor-based device may provide an arbitration circuit that is associated with the shared resource (i.e., an "arbitrated resource"), and that is configured to arbitrate requests from the multiple clients for access to the arbitrated resource.

One conventional arbitration mechanism makes use of a request tracker circuit that provides a plurality of request tracker entries that are each associated with one or more requests from clients, e.g., for placement in an output request queue. The arbitration circuit in such mechanisms applies a single-request arbitration grant policy, under which each request tracker entry has equal priority to arbitrate for the arbitrated resource (the output request queue, in this example) and each arbitration grant is issued for one (1) request. As a result, a request tracker entry that is associated with a number N of linked requests (e.g., requests relating to a single transaction or operation) would require a total of N arbitration grants to place all linked requests for that request tracker entry into the arbitrated resource. Assuming a total number T of request tracker entries that all have requests ready for arbitration, one likely scenario is that one (1) of the N linked requests of the request tracker entry receives an arbitration grant within a given processor cycle, while the remaining N−1 linked requests of the request tracker entry may require up to N*T processor cycles for all of the requests to receive arbitration grants. In cases where the requests are time-sensitive and need to be tightly coupled to achieve optimum performance, such a conventional arbitration mechanism would negatively impact processor performance, and would result in longer lifetimes for each request tracker entry and slower processing of requests generally.

The challenges described above that are encountered when processing linked requests may be mitigated through the use of a "parked arbiter" mechanism, which attempts to detect linked commands and "parks" a pointer at a current request tracker entry instead of advancing to the next request tracker entry. While this mechanism may allow the same request tracker entry to win arbitration grants in consecutive arbitrations, this approach results in a more complex design for the arbitration circuit, and requires the use of different arbitration grant policies for linked requests and non-linked requests. Moreover, while the parked arbiter approach may result in back-to-back arbitration wins for linked requests of a request tracker entry, there is no guarantee that the requests will be processed in temporal proximity to each other.

SUMMARY

Exemplary embodiments disclosed herein include providing multi-request arbitration grant policies for time-sensitive arbitration decisions in processor-based devices. In this regard, in one exemplary embodiment, a processor-based device comprises an arbitrated resource that includes a plurality of resource elements. The arbitrated resource in some embodiments may comprise an output request queue, while the plurality of resource elements may comprise a plurality of output request queue entries of the output request queue. The processor-based device also comprises a request tracker circuit that includes a plurality of request tracker entries. The request tracker entries each may be associated with one or more requests (e.g., requests or commands seeking access to the arbitrated resource). To arbitrate the requests, the processor-based device provides an arbitration circuit. In exemplary operation, the arbitration circuit selects a request tracker entry to apply a multi-request arbitration grant policy. The arbitration circuit determines a count N of the requests associated with the request tracker entry, and further determines a count R of the resource elements of the arbitrated resource that are available for arbitration. The arbitration circuit then determines whether the count R of resource elements that are available is equal to or greater than N, and, if so, the arbitration circuit issues a single arbitration grant for the plurality of requests associated with the first request tracker entry to the request tracker circuit.

In some embodiments, the arbitration circuit may provide a mechanism to reduce the likelihood of starvation of request tracker entries. In such embodiments, the arbitration circuit maintains a plurality of lost arbitration counts that correspond to the plurality of request tracker entries. Each lost arbitration count is used to track a number of consecutive arbitrations that are lost for each corresponding request tracker entry. If the arbitration circuit determines that the count R of resource elements that are available is equal to or greater than N, the arbitration circuit resets the lost arbitration count associated with the request tracker entry to a value of zero (0). However, if the arbitration circuit determines the count R of resource elements that are available is not equal to or greater than N, then the arbitration circuit increments the lost arbitration count associated with the request tracker entry of the plurality of lost arbitration counts. The arbitration circuit then determines whether at least one of the plurality of lost arbitration counts exceeds a starvation threshold. If so, the arbitration circuit applies a single-request arbitration grant policy to a next request tracker entry of the plurality of request tracker entries. If none of the plurality of lost arbitration counts exceeds the starvation threshold, the arbitration circuit applies the multi-request arbitration grant policy to the next request tracker entry of the plurality of request tracker entries.

Some embodiments may provide that the arbitration circuit determines the count R of resource elements that are available by determining a count of credits received from the arbitrated resource. According to some embodiments, the arbitration circuit may determine the count R of resource elements that are available by querying the arbitrated resource for the count R of resource elements that are available.

In another exemplary embodiment, a processor-based device is disclosed. The processor-based device comprises an arbitrated resource comprising a plurality of resource elements, and further comprises a request tracker circuit comprising a plurality of request tracker entries each associated with a transaction comprising one or more requests for corresponding one or more resource elements. The processor-based device also comprises an arbitration circuit configured to select a first request tracker entry of the plurality of request tracker entries of the request tracker circuit to apply a multi-request arbitration grant policy. The arbitration circuit is further configured to determine a count N of a plurality of requests associated with the first request tracker entry. The arbitration circuit is also configured to determine a count R of resource elements that are available of the plurality of resource elements of the arbitrated resource. The arbitration circuit is additionally configured to determine whether the count R of resource elements that are available is equal to or greater than N. The arbitration circuit is further configured to, responsive to determining that the count R of resource elements that are available is equal to or greater than N, issue a single arbitration grant for the plurality of requests associated with the first request tracker entry to the request tracker circuit.

In another exemplary embodiment, a method for providing multi-request arbitration grant policies is disclosed. The method comprises selecting, by an arbitration circuit of a processor-based device, a first request tracker entry of a plurality of request tracker entries of a request tracker circuit to apply a multi-request arbitration grant policy. The method further comprises determining a count N of a plurality of requests associated with the first request tracker entry. The method also comprises determining a count R of resource elements that are available of a plurality of resource elements of an arbitrated resource. The method additionally comprises determining that the count R of resource elements that are available is equal to or greater than N. The method further comprises, responsive to determining that the count R of resource elements that are available is equal to or greater than N, issuing a single arbitration grant for the plurality of requests associated with the first request tracker entry to the request tracker circuit.

In another exemplary embodiment, a non-transitory computer-readable medium is disclosed. The non-transitory computer-readable medium stores thereon computer-executable instructions that, when executed, cause a processor of a processor-based system to select a first request tracker entry of a plurality of request tracker entries of a request tracker circuit to apply a multi-request arbitration grant policy. The computer-executable instructions further cause the processor to determine a count N of a plurality of requests associated with the first request tracker entry. The computer-executable instructions also cause the processor to determine a count R of resource elements that are available of a plurality of resource elements of an arbitrated resource. The computer-executable instructions additionally cause the processor to determine whether the count R of resource elements that are available is equal to or greater than N. The computer-executable instructions further cause the processor to, responsive to determining that the count R of resource elements that are available is equal to or greater than N, issue a single arbitration grant for the plurality of requests associated with the first request tracker entry to the request tracker circuit.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 2A:
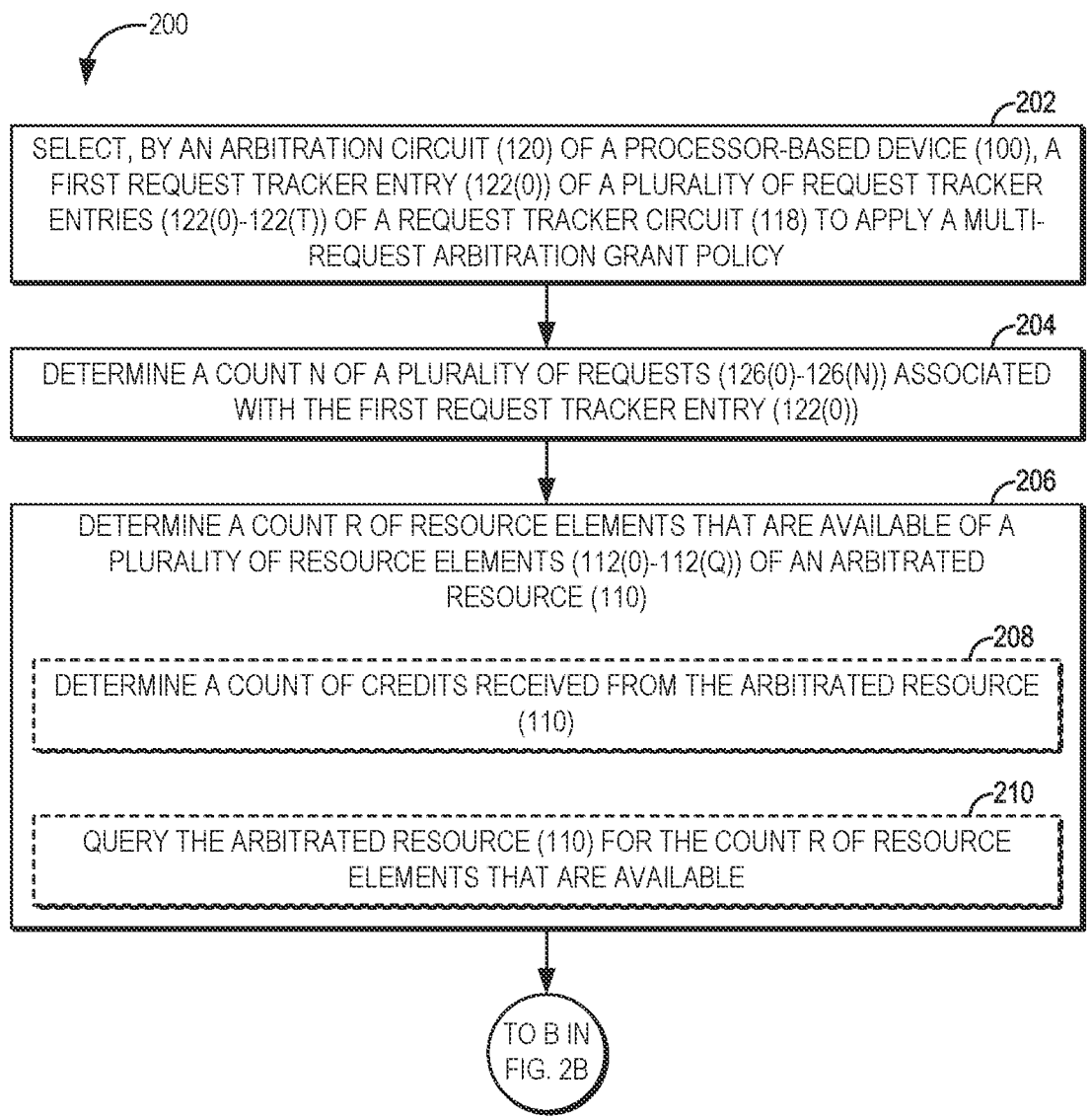
Figure 2B:
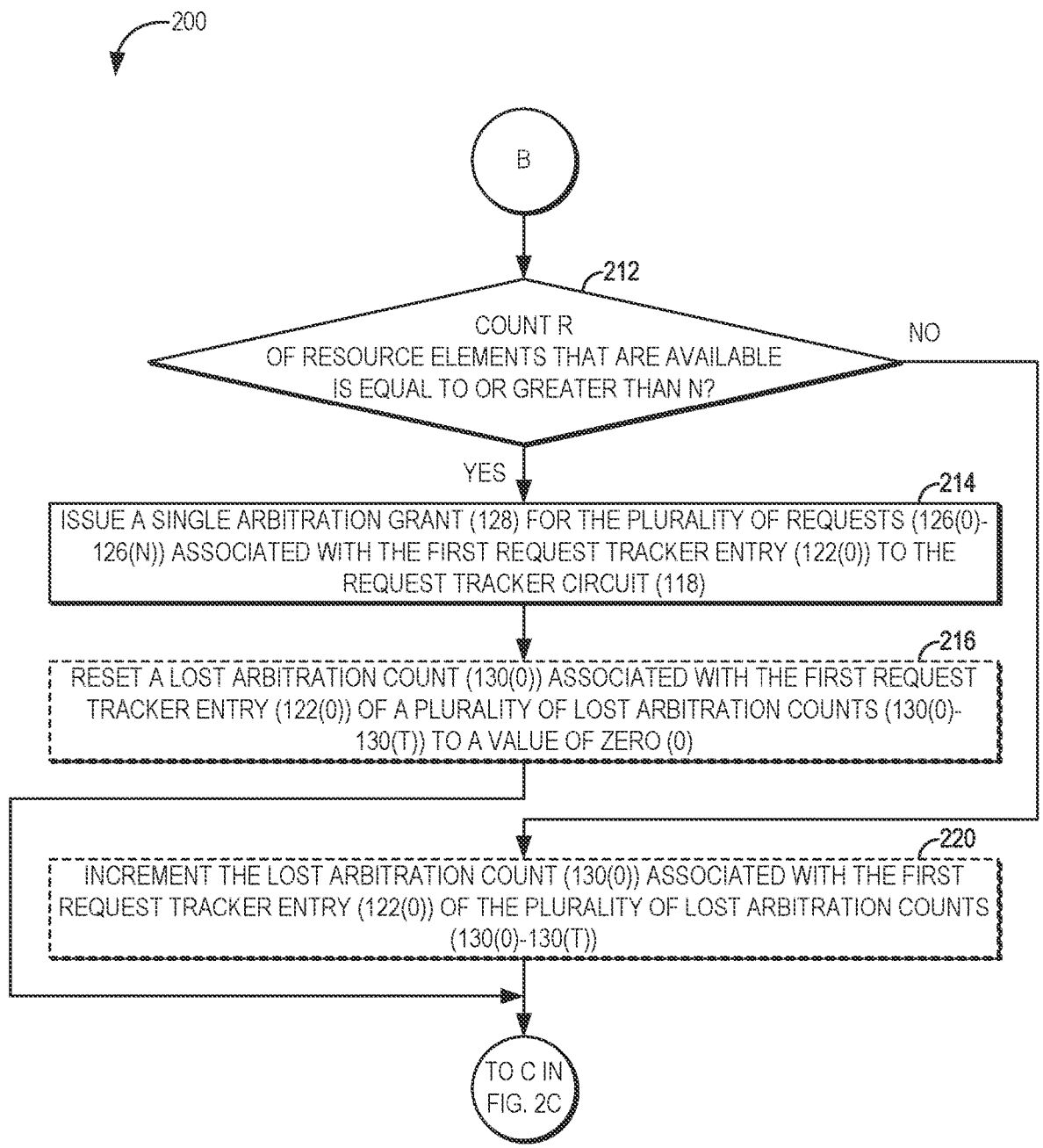
Figure 2C:
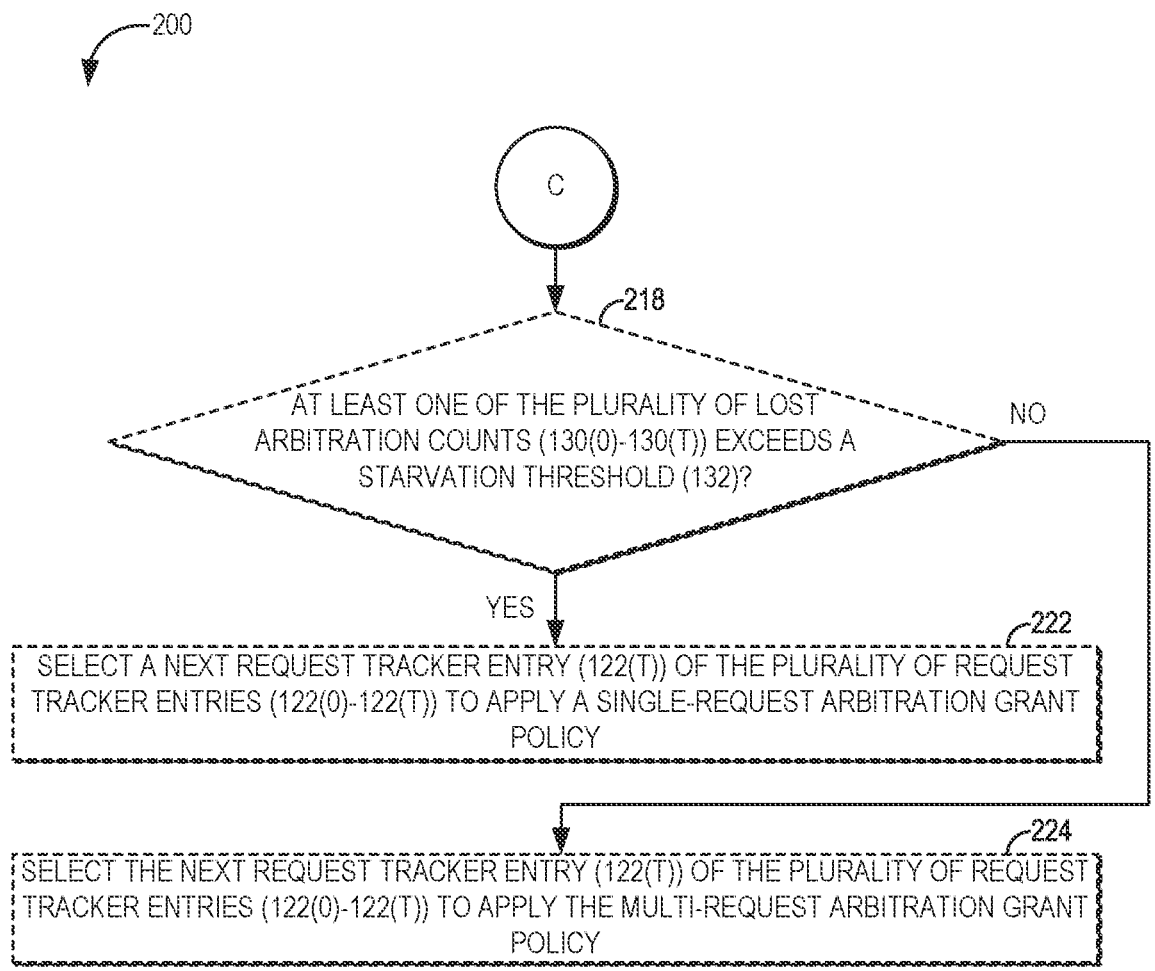
Figure 3:
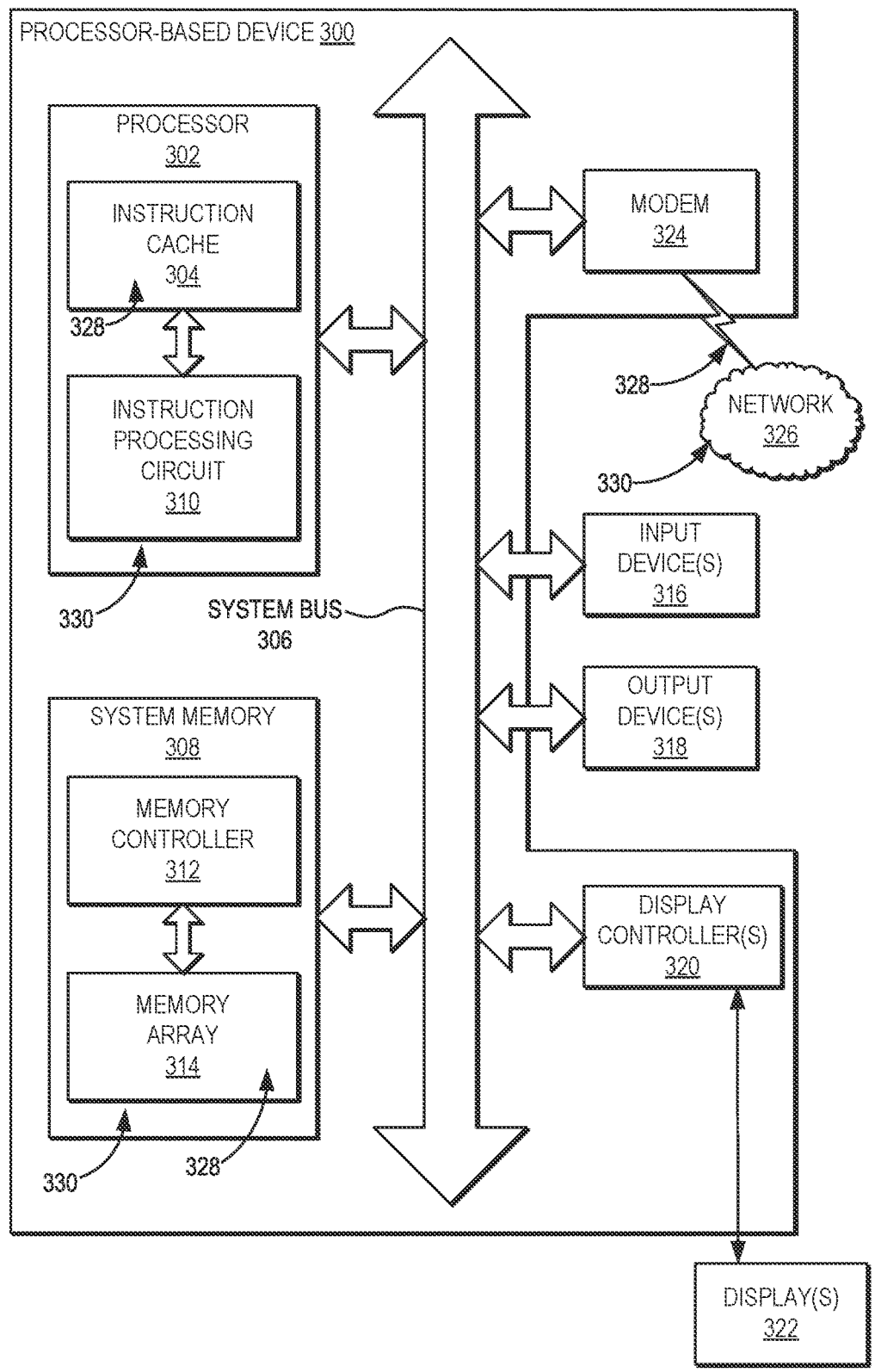

FIG. 1 is a block diagram illustrating an exemplary processor-based device including an arbitration circuit that is configured to provide multi-request arbitration grant policies;

FIGS. 2A-2C provides a flowchart illustrating exemplary operations of the processor-based device of FIG. 1 for provide multi-request arbitration grant policies, according to some embodiments; and FIG. 3 is a block diagram of an exemplary processor-based device, such as the processor-based device of FIG. 1, that is configured to provide multi-request arbitration grant policies, according to some embodiments.

DETAILED DESCRIPTION

Exemplary embodiments disclosed herein include providing multi-request arbitration grant policies for time-sensitive arbitration decisions in processor-based devices. In this regard, in one exemplary embodiment, a processor-based device comprises an arbitrated resource that includes a plurality of resource elements. The arbitrated resource in some embodiments may comprise an output request queue, while the plurality of resource elements may comprise a plurality of output request queue entries of the output request queue. The processor-based device also comprises a request tracker circuit that includes a plurality of request tracker entries. The request tracker entries each may be associated with one or more requests (e.g., requests or commands seeking access to the arbitrated resource). To arbitrate the requests, the processor-based device provides an arbitration circuit. In exemplary operation, the arbitration circuit selects a request tracker entry to apply a multi-request arbitration grant policy. The arbitration circuit determines a count N of the requests associated with the request tracker entry, and further determines a count R of the resource elements of the arbitrated resource that are available for arbitration. The arbitration circuit then determines whether the count R of resource elements that are available is equal to or greater than N, and, if so, the arbitration circuit issues a single arbitration grant for the plurality of requests associated with the first request tracker entry to the request tracker circuit.

In some embodiments, the arbitration circuit may provide a mechanism to reduce the likelihood of starvation of request tracker entries. In such embodiments, the arbitration circuit maintains a plurality of lost arbitration counts that correspond to the plurality of request tracker entries. Each lost arbitration count is used to track a number of consecutive arbitrations that are lost for each corresponding request tracker entry. If the arbitration circuit determines that the count R of resource elements that are available is equal to or greater than N, the arbitration circuit resets the lost arbitration count associated with the request tracker entry to a value of zero (0). However, if the arbitration circuit determines the count R of resource elements that are available is not equal to or greater than N, then the arbitration circuit increments the lost arbitration count associated with the request tracker entry of the plurality of lost arbitration counts. The arbitration circuit then determines whether at least one of the plurality of lost arbitration counts exceeds a starvation threshold. If so, the arbitration circuit applies a single-request arbitration grant policy to a next request tracker entry of the plurality of request tracker entries. If none of the plurality of lost arbitration counts exceeds the starvation threshold, the arbitration circuit applies the multi-request arbitration grant policy to the next request tracker entry of the plurality of request tracker entries.

Some embodiments may provide that the arbitration circuit determines the count R of resource elements that are available by determining a count of credits received from the arbitrated resource. According to some embodiments, the arbitration circuit may determine the count R of resource elements that are available by querying the arbitrated resource for the count R of resource elements that are available.

In this regard, FIG. 1 illustrates an exemplary processor-based device 100 that provides a processor 102 for providing multi-request arbitration grant policies. The processor 102 in some aspects may comprise a central processing unit (CPU) having one or more processor cores, and in some exemplary aspects may be one of a plurality of similarly configured processors (not shown) of the processor-based device 100. The processor 102 is communicatively coupled to an interconnect bus 104, which in some embodiments may include additional constituent elements (e.g., a bus controller circuit and/or an arbitration circuit, as non-limiting examples) that are not shown in FIG. 1 for the sake of clarity. The processor 102 is also communicatively coupled, via the interconnect bus 104, to a memory controller 106 that controls access to a system memory 108 and manages the flow of data to and from the system memory 108. The system memory 108 provides addressable memory used for data storage by the processor-based device 100, and as such may comprise synchronous dynamic random access memory (SDRAM), as a non-limiting example.

The processor 102 of FIG. 1 provides an arbitrated resource 110 that comprises a plurality of resource elements 112(0)-112(Q). As used herein, the term "arbitrated resource" refers to any resource that may be shared among multiple clients (e.g., multiple devices or elements of the processor-based device 100, and/or multiple processes (not shown) being executed by the processor-based device 100). The term "resource element" as used herein refers to a discrete subset of the arbitrated resource 110 that may be assigned to and accessed by or on behalf of a single client. In the example of FIG. 1, the arbitrated resource 110 comprises an output request queue 114, while the plurality of resource elements 112(0)-112(Q) comprise a plurality of output request queue entries (captioned as "OUT REQ Q ENTRY" in FIG. 1) 116(0)-116(Q) of the output request queue 114.

To manage access to the arbitrated resource 110 (i.e., to the output request queue 114 in the example of FIG. 1), the processor 102 provides a request tracker circuit 118 and an arbitration circuit 120. The request tracker circuit 118 provides a plurality of request tracker entries 122(0)-122(T), each of which may be used to track one or more requests. As used herein, a "request" comprises an access request or command issued by a client (not shown). Some request tracker entries, such as the request tracker entry 122(T), may be associated with a single request 124, while other request tracker entries such as the request tracker entry 122(0) may be associated with a plurality of requests 126(0)-126(N). The requests 126(0)-126(N) (which may also be referred to herein as "linked requests 126(0)-126(N)") may relate to a single transaction or operation, such that it is desirable that the requests 126(0)-126(N) be dispatched in as temporal proximity as possible.

The arbitration circuit 120 of FIG. 1 is configured to select a request tracker entry from among the request tracker entries 122(0)-122(T), and apply an arbitration grant policy to control access to the arbitrated resource 110 for the request(s) associated with each of the request tracker entries 122(0)-122(T). The arbitration circuit 120 may select a request tracker entry from among the request tracker entries 122(0)-122(T) using any conventional arbitration criteria.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the processor 102 may further include one or more functional units, instruction caches, unified caches, memory controllers, interconnect buses, and/or additional memory devices, caches, and/or controller circuits, which are omitted from FIG. 1 for the sake of clarity. It is to be further understood that, while the request tracker circuit 118, the arbitration circuit 120, and the arbitrated resource 110 are illustrated as separate elements in FIG. 1, in some embodiments one or more may be implemented as integral elements of another component of the processor-based device 100.

As noted above, conventional arbitration mechanisms involve the arbitration circuit 120 applying a single-request arbitration grant policy, under which each request tracker entry 122(0)-122(T) has equal priority to arbitrate for the arbitrated resource 110, and each arbitration grant is issued for one (1) request such as the requests 126(0)-126(N) and 124. Consequently, the request tracker entry 122(0) that is associated with a number N of requests 126(0)-126(N) would require a total of N arbitration grants to complete all of the requests 126(0)-126(N). A likely scenario that may result is that one (1) of the requests 126(0)-126(N) of the request tracker entry 122(0) receives an arbitration grant within a given processor cycle, while the remaining ones of the requests 126(0)-126(N) of the request tracker entry 122(0) may require up to N*T processor cycles to all receive arbitration grants. Such conventional arbitration mechanisms would negatively impact processor performance in cases where the requests 126(0)-126(N) are time-sensitive and need to be tightly coupled to achieve optimum performance, and would result in longer lifetimes for each of the request tracker entry 122(0)-122(T) and slower processing of the requests 126(0)-126(N) and 124 generally.

In this regard, the arbitration circuit 120 of FIG. 1 is configured to provide multi-request arbitration grant policies, under which multiple ones of the requests 126(0)-126(N) and 124 may be encompassed by a single arbitration grant. In exemplary operation, the arbitration circuit 120 selects a request tracker entry such as the request tracker entry 122(0) to apply a multi-request arbitration grant policy. The arbitration circuit 120 determines a count N of the requests 126(0)-126(N) associated with the request tracker entry 122(0), and further determines a count R of resource elements that are available (i.e., to be used to fulfill, process, or store requests such as the requests 126(0)-126(N)) among the resource elements 112(0)-112(Q) of the arbitrated resource 110. In some embodiments, access to the arbitrated resource 110 may be governed using a credit mechanism, whereby the arbitrated resource 110 grants credit(s) corresponding to available resource elements among the resource elements 112(0)-112(Q) to the request tracker entries 122(0)-122(T). In such embodiments, the arbitration circuit 120 may determine the count R of resource elements that are available among the resource elements 112(0)-112(Q) by determining a count of credits (not shown) received from the arbitrated resource 110. Some embodiments may provide that the arbitration circuit 120 may determine the count R of resource elements that are available among the resource elements 112(0)-112(Q) by querying the arbitrated resource 110 for the count R of resource elements that are available.

The arbitration circuit 120 then determines whether the count R of resource elements that are available is equal to or greater than N. If so, the arbitration circuit 120 issues a single arbitration grant 128 for the plurality of requests 126(0)-126(N) associated with the first request tracker entry 122(0) to the request tracker circuit 118. By issuing the single arbitration grant 128 for the plurality of requests 126(0)-126(N), the arbitration circuit 120 can optimize performance of the plurality of requests 126(0)-126(N) compared to waiting for N separate arbitration grants, which may occur several processor cycles apart. Thus, in the example of FIG. 1, if N=2 and the arbitration circuit 120 determines that the output request queue entries 116(0) and 116(1) are both available, the arbitration grant 128 causes the requests 126(0)-126(N) to be inserted into the output request queue entries 116(0) and 116(1) within a same processor cycle or in processor cycles in close temporal proximity, resulting in optimized performance.

To ensure that request tracker entries that are associated with only a single request (e.g., the request tracker entry 122(T) of FIG. 1) are not starved due to the arbitration circuit 120 prioritizing request tracker entries associated with multiple requests, the arbitration circuit 120 in some embodiments may further provide a starvation prevention mechanism. As seen in FIG. 1, the arbitration circuit 120 may comprise a plurality of lost arbitration counts (captioned as "LOST ARB COUNT" in FIG. 1) 130(0)-130(T) corresponding to the request tracker entries 122(0)-122(T). Each of the lost arbitration counts 130(0)-130(T) tracks a number of consecutive arbitrations that are lost for the corresponding request tracker entry 122(0)-122(T). When an arbitration for a request tracker entry such as the request tracker entry 122(0) is successful (i.e., the count R of resource elements that are available is not equal to or greater than N), the arbitration circuit 120 may reset the lost arbitration count 130(0) associated with the request tracker entry 122(0) of the plurality of lost arbitration counts 130(0)-130(T) to a value of zero (0). However, if the arbitration circuit 120 determines the count R of resource elements that are available is not equal to or greater than N, the arbitration circuit 120 may increment the lost arbitration count 130(0) associated with the first request tracker entry 122(0).

The arbitration circuit 120 may then determine whether at least one of the plurality of lost arbitration counts 130(0)-130(T) exceeds a starvation threshold 132. If so, the arbitration circuit 120 selects a next request tracker entry, such as the request tracker entry 122(T), of the plurality of request tracker entries 122(0)-122(T) to apply a single-request arbitration grant policy (i.e., a policy whereby each arbitration grant applies to one (1) request). If the arbitration circuit 120 determines that none of the plurality of lost arbitration counts 130(0)-130(T) exceeds the starvation threshold 132, the arbitration circuit 120 selects the next request tracker entry 122(T) of the plurality of request tracker entries 122(0)-122(T) to apply the multi-request arbitration grant policy. It is to be understood that the "next request tracker entry" refers to a request tracker entry that is subsequently selected and processed by the arbitration circuit 120, and does not necessarily refer to the "next" request tracker entry in the ordinal sense.

To illustrate exemplary operations of the processor-based device 100 of FIG. 1 for provide multi-request arbitration grant policies according to some embodiments, FIGS. 2A-2C provide a flowchart illustrating exemplary operations 200. For the sake of clarity, elements of FIG. 1 are referenced in describing FIGS. 2A-2C. It is to be understood that some of the exemplary operations 200 illustrated in FIGS. 2A-2C may be performed in an order other than that illustrated herein or may be omitted. The exemplary operations 200 begin in FIG. 2A with an arbitration circuit of a processor-based device (e.g., the arbitration circuit 120 of the processor-based device 100 of FIG. 1) selecting a first request tracker entry of a plurality of request tracker entries of a request tracker circuit (such as the request tracker entry 122(0) of the plurality of request tracker entries 122(0)-122(T) of the request tracker circuit 118 of FIG. 1) to apply a multi-request arbitration grant policy (block 202). The arbitration circuit 120 determines a count N of a plurality of requests (e.g., the requests 126(0)-126(N) of FIG. 1) associated with the first request tracker entry 122(0) (block 204). The arbitration circuit 120 also determines a count R of resource elements of a plurality of resource elements of an arbitrated resource (such as the resource elements 112(0)-112(Q) of the arbitrated resource 110 of FIG. 1) that are available (block 206). In some embodiments, the operations of block 206 for determining the count R of resource elements that are available may comprise the arbitration circuit 120 determining a count of credits received from the arbitrated resource 110 (block 208). Some embodiments may provide that the operations of block 206 for determining the count R of resource elements that are available comprises the arbitration circuit 120 querying the arbitrated resource 110 for the count R of resource elements that are available (block 210). The exemplary operations 200 then continue at block 212 of FIG. 2B.

Referring now to FIG. 2B, the arbitration circuit 120 determines whether the count R of resource elements that are available is equal to or greater than N (block 212). If so, the arbitration circuit 120 issues a single arbitration grant (e.g., the arbitration grant 128 of FIG. 1) for the plurality of requests 126(0)-126(N) associated with the first request tracker entry 122(0) to the request tracker circuit 118 (block 214). In some embodiments, the arbitration circuit 120 may also reset a lost arbitration count associated with the first request tracker entry 122(0) of a plurality of lost arbitration counts (such as the lost arbitration count 130(0) of the plurality of lost arbitration counts 130(0)-130(T) of FIG. 1) to a value of zero (0) (block 216). The exemplary operations 200 then continue at block 218 of FIG. 2C. However, if the arbitration circuit 120 determines at decision block 212 that the count R of resource elements that are available is not equal to or greater than N, then the arbitration circuit 120 in some embodiments may increment the lost arbitration count 130(0) associated with the first request tracker entry 122(0) of the plurality of lost arbitration counts 130(0)-130(T) (block 220). The exemplary operations 200 then continue at block 218 of FIG. 2C.

Turning now to FIG. 2C, the arbitration circuit 120 according to some aspects may determine whether at least one of the plurality of lost arbitration counts 130(0)-130(T) exceeds a starvation threshold (such as the starvation threshold 132 of FIG. 1) (block 218). If so, the arbitration circuit 120 selects a next request tracker entry (e.g., the request tracker entry 122(T) of FIG. 1) of the plurality of request tracker entries 122(0)-122(T) to apply a single-request arbitration grant policy (block 222). If the arbitration circuit 120 determines at decision block 218 that none of the plurality of lost arbitration counts 130(0)-130(T) exceeds the starvation threshold 132, the arbitration circuit 120 selects the next request tracker entry 122(T) of the plurality of request tracker entries 122(0)-122(T) to apply the multi-request arbitration grant policy (block 224).

FIG. 3 is a block diagram of an exemplary processor-based device 300, such as the processor-based device 100 of FIG. 1, that provides multi-request arbitration grant policies for time-sensitive arbitration decisions. The processor-based device 300 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 300 includes a processor 302. The processor 302 represents one or more general-purpose processing circuits, such as a microprocessor, central processing unit, or the like, and may correspond to the processor 102 of FIG. 1. The processor 302 is configured to execute processing logic in instructions for performing the operations and steps discussed herein. In this example, the processor 302 includes an instruction cache 304 for temporary, fast access memory storage of instructions and an instruction processing circuit 310. Fetched or prefetched instructions from a memory, such as from a system memory 308 over a system bus 306, are stored in the instruction cache 304. The instruction processing circuit 310 is configured to process instructions fetched into the instruction cache 304 and process the instructions for execution.

The processor 302 and the system memory 308 are coupled to the system bus 306 and can intercouple peripheral devices included in the processor-based device 300. As is well known, the processor 302 communicates with these other devices by exchanging address, control, and data information over the system bus 306. For example, the processor 302 can communicate bus transaction requests to a memory controller 312 in the system memory 308 as an example of a peripheral device. Although not illustrated in FIG. 3, multiple system buses 306 could be provided, wherein each system bus constitutes a different fabric. In this example, the memory controller 312 is configured to provide memory access requests to a memory array 314 in the system memory 308. The memory array 314 is comprised of an array of storage bit cells for storing data. The system memory 308 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 306. As illustrated in FIG. 3, these devices can include the system memory 308, one or more input device(s) 316, one or more output device(s) 318, a modem 324, and one or more display controller(s) 320, as examples. The input device(s) 316 can include any type of input device, including, but not limited to, input keys, switches, voice processors, etc. The output device(s) 318 can include any type of output device, including, but not limited to, audio, video, other visual indicators, etc. The modem 324 can be any device configured to allow exchange of data to and from a network 326. The network 326 can be any type of network, including, but not limited to, a wired or wireless network, a private or public network, a local area network (LAN), a wireless local area network (WLAN), a wide area network (WAN), a BLUETOOTH™ network, and the Internet. The modem 324 can be configured to support any type of communications protocol desired. The processor 302 may also be configured to access the display controller(s) 320 over the system bus 306 to control information sent to one or more display(s) 322. The display(s) 322 can include any type of display, including, but not limited to, a cathode ray tube (CRT), a liquid crystal display (LCD), a plasma display, etc.

The processor-based device 300 in FIG. 3 may include a set of instructions 328 that may be executed by the processor 302 for any application desired according to the instructions. The instructions 328 may be stored in the system memory 308, processor 302, and/or instruction cache 304 as examples of non-transitory computer-readable medium 330. The instructions 328 may also reside, completely or at least partially, within the system memory 308 and/or within the processor 302 during their execution. The instructions 328 may further be transmitted or received over the network 326 via the modem 324, such that the network 326 includes the computer-readable medium 330.

While the computer-readable medium 330 is shown in an exemplary embodiment to be a single medium, the term "computer-readable medium" should be taken to include a single medium or multiple media (e.g., a centralized or distributed database, and/or associated caches and servers) that store the one or more sets of instructions 328. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
   an arbitrated resource comprising a plurality of resource elements;
   a request tracker circuit comprising a plurality of request tracker entries each associated with a transaction comprising one or more requests for corresponding one or more resource elements; and
   an arbitration circuit configured to:
      select a first request tracker entry of the plurality of request tracker entries of the request tracker circuit to apply a multi-request arbitration grant policy, wherein the first request tracker entry is associated with a transaction comprising a plurality of linked requests;
      determine a count N of the plurality of linked requests associated with the first request tracker entry;
      determine a count R of resource elements that are available of the plurality of resource elements of the arbitrated resource;
      determine whether the count R of resource elements that are available is equal to or greater than N; and
      responsive to determining that the count R of resource elements that are available is equal to or greater than N, issue a single arbitration grant for the plurality of linked requests associated with the first request tracker entry to the request tracker circuit.

2. The processor-based device of claim 1, wherein the arbitration circuit is further configured to, responsive to determining that the count R of resource elements that are available is not equal to or greater than N, select a next request tracker entry of the plurality of request tracker entries to apply the multi-request arbitration grant policy.

3. The processor-based device of claim 1, wherein the arbitration circuit is further configured to:
responsive to determining that the count R of resource elements that are available is equal to or greater than N, reset a lost arbitration count associated with the first request tracker entry of a plurality of lost arbitration counts to a value of zero (0);
responsive to determining that the count R of resource elements that are available is not equal to or greater than N, increment the lost arbitration count associated with the first request tracker entry;
determine whether at least one of the plurality of lost arbitration counts exceeds a starvation threshold;
responsive to determining that at least one of the plurality of lost arbitration counts exceeds the starvation threshold, select a next request tracker entry of the plurality of request tracker entries to apply a single-request arbitration grant policy; and
responsive to determining that none of the plurality of lost arbitration counts exceeds the starvation threshold, select the next request tracker entry of the plurality of request tracker entries to apply the multi-request arbitration grant policy.

4. The processor-based device of claim 1, wherein:
the arbitrated resource comprises an output request queue; and
the plurality of resource elements comprises a plurality of output request queue entries of the output request queue.

5. The processor-based device of claim 1, wherein the arbitration circuit is configured to determine the count R of resource elements that are available by being configured to determine a count of credits received from the arbitrated resource.

6. The processor-based device of claim 1, wherein the arbitration circuit is configured to determine the count R of resource elements that are available by being configured to query the arbitrated resource for the count R of resource elements that are available.

7. A method for providing multi-request arbitration grant policies, comprising:
selecting, by an arbitration circuit of a processor-based device, a first request tracker entry of a plurality of request tracker entries of a request tracker circuit to apply a multi-request arbitration grant policy, wherein the first request tracker entry is associated with a transaction comprising a plurality of linked requests;
determining a count N of the plurality of linked requests associated with the first request tracker entry;
determining a count R of resource elements that are available of a plurality of resource elements of an arbitrated resource;
determining that the count R of resource elements that are available is equal to or greater than N; and
responsive to determining that the count R of resource elements that are available is equal to or greater than N, issuing a single arbitration grant for the plurality of linked requests associated with the first request tracker entry to the request tracker circuit.

8. The method of claim 7, further comprising, responsive to determining that the count R of resource elements that are available is equal to or greater than N, resetting a lost arbitration count associated with the first request tracker entry of a plurality of lost arbitration counts to a value of zero (0).

9. The method of claim 7, further comprising:
selecting a second request tracker entry of the plurality of request tracker entries of the request tracker circuit to apply the multi-request arbitration grant policy;
determining a count X of a plurality of requests associated with the second request tracker entry;
determining a count Z of resource elements that are available of the plurality of resource elements of the arbitrated resource;
determining that the count Z of resource elements that are available is not equal to or greater than X; and
responsive to determining that the count Z of resource elements that are available is not equal to or greater than X, select a next request tracker entry of the plurality of request tracker entries to apply the multi-request arbitration grant policy.

10. The method of claim 9, further comprising, responsive to determining that the count Z of resource elements that are available is not equal to or greater than X, incrementing a lost arbitration count associated with the second request tracker entry.

11. The method of claim 7, further comprising:
determining that none of a plurality of lost arbitration counts exceeds a starvation threshold; and
responsive to determining that none of the plurality of lost arbitration counts exceeds the starvation threshold, select a next request tracker entry of the plurality of request tracker entries to apply the multi-request arbitration grant policy.

12. The method of claim 7, further comprising:
determining that at least one of a plurality of lost arbitration counts exceeds a starvation threshold; and
responsive to determining that at least one of the plurality of lost arbitration counts exceeds the starvation threshold, select a next request tracker entry of the plurality of request tracker entries to apply a single-request arbitration grant policy.

13. The method of claim 7, wherein:
the arbitrated resource comprises an output request queue; and
the plurality of resource elements comprises a plurality of output request queue entries of the output request queue.

14. The method of claim 7, wherein determining the count R of resource elements that are available comprises determining a count of credits received from the arbitrated resource.

15. The method of claim 7, wherein determining the count R of resource elements that are available comprises querying the arbitrated resource for the count R of resource elements that are available.

16. A non-transitory computer-readable medium, having stored thereon computer-executable instructions that, when executed, cause a processor of a processor-based device to:
select a first request tracker entry of a plurality of request tracker entries of a request tracker circuit to apply a multi-request arbitration grant policy, wherein the first request tracker entry is associated with a transaction comprising a plurality of linked requests;
determine a count N of the plurality of linked requests associated with the first request tracker entry;
determine a count R of resource elements that are available of a plurality of resource elements of an arbitrated resource;

determine whether the count R of resource elements that are available is equal to or greater than N; and responsive to determining that the count R of resource elements that are available is equal to or greater than N, issue a single arbitration grant for the plurality of linked requests associated with the first request tracker entry to the request tracker circuit.

17. The non-transitory computer-readable medium of claim 16, wherein the computer-executable instructions further cause the processor to, responsive to determining that the count R of resource elements that are available is not equal to or greater than N, select a next request tracker entry of the plurality of request tracker entries to apply the multi-request arbitration grant policy.

18. The non-transitory computer-readable medium of claim 16, wherein the computer-executable instructions further cause the processor to:

responsive to determining that the count R of resource elements that are available is equal to or greater than N, reset a lost arbitration count associated with the first request tracker entry of a plurality of lost arbitration counts to a value of zero (0);

responsive to determining that the count R of resource elements that are available is not equal to or greater than N, increment the lost arbitration count associated with a second request tracker entry;

determine whether at least one of the plurality of lost arbitration counts exceeds a starvation threshold;

responsive to determining that at least one of the plurality of lost arbitration counts exceeds the starvation threshold, select a next request tracker entry of the plurality of request tracker entries to apply a single-request arbitration grant policy; and responsive to determining that none of the plurality of lost arbitration counts exceeds the starvation threshold, select the next request tracker entry of the plurality of request tracker entries to apply the multi-request arbitration grant policy.

19. The non-transitory computer-readable medium of claim 16, wherein:

the arbitrated resource comprises an output request queue; and the plurality of resource elements comprises a plurality of output request queue entries of the output request queue.

20. The non-transitory computer-readable medium of claim 16, wherein the computer-executable instructions further cause the processor to determine the count R of resource elements that are available by causing the processor to determine a count of credits received from the arbitrated resource.

* * * * *